US009004374B1

(12) United States Patent
Gans

(10) Patent No.: US 9,004,374 B1
(45) Date of Patent: Apr. 14, 2015

(54) IRRIGATION METHOD USING THIXOTROPIC MATERIALS

(71) Applicant: Stephen Gans, Seffner, FL (US)

(72) Inventor: Stephen Gans, Seffner, FL (US)

( * ) Notice: Subject to any disclaimer, the term of this patent is extended or adjusted under 35 U.S.C. 154(b) by 0 days.

(21) Appl. No.: 13/936,407

(22) Filed: Jul. 8, 2013

Related U.S. Application Data

(63) Continuation-in-part of application No. 13/553,374, filed on Jul. 19, 2012, now abandoned.

(60) Provisional application No. 61/670,199, filed on Jul. 11, 2012, provisional application No. 61/545,493, filed on Oct. 10, 2011, provisional application No. 61/509,880, filed on Jul. 20, 2011.

(51) Int. Cl.
*C05B 3/00* (2006.01)
*A01C 23/04* (2006.01)
*C05F 11/08* (2006.01)

(52) U.S. Cl.
CPC ............... *A01C 23/042* (2013.01); *C05F 11/08* (2013.01)

(58) Field of Classification Search
CPC .................................................... A01C 23/042
USPC ............................. 71/11–63, 6; 239/727, 10
See application file for complete search history.

(56) References Cited

U.S. PATENT DOCUMENTS

| | | | | |
|---|---|---|---|---|
| 2,799,569 | A * | 7/1957 | Wordie et al. | 71/42 |
| 3,464,626 | A * | 9/1969 | Stamps et al. | 239/10 |
| 4,917,304 | A * | 4/1990 | Mazzei et al. | 239/64 |
| 5,246,164 | A * | 9/1993 | McCann et al. | 239/11 |
| 6,471,741 | B1 * | 10/2002 | Reinbergen | 71/6 |
| 8,568,506 | B1 * | 10/2013 | Miller et al. | 71/28 |
| 8,628,598 | B1 * | 1/2014 | Miller et al. | 71/28 |
| 2003/0066322 | A1 * | 4/2003 | Perriello | 71/24 |
| 2006/0243009 | A1 * | 11/2006 | Burnham | 71/11 |
| 2009/0031775 | A1 * | 2/2009 | Bevans et al. | 71/23 |
| 2009/0238907 | A1 * | 9/2009 | Farmer | 424/780 |
| 2010/0062944 | A1 * | 3/2010 | Webster | 504/358 |
| 2011/0160058 | A1 * | 6/2011 | Fedkenheuer et al. | 504/101 |
| 2012/0036906 | A1 * | 2/2012 | Pedersen | 71/23 |
| 2012/0255334 | A1 * | 10/2012 | Gans | 71/6 |

* cited by examiner

*Primary Examiner* — Wayne Langel

(57) ABSTRACT

The steps of the irrigation method include: flowing a stream of water having input and output and intermediate location; interposing a feeding device into the stream of water at the intermediate location, the feeding device having input and output ends; inserting a quantity of nutrient fertilizer into the feeding device; converting the nutrient fertilizer from the viscous state to the less viscous state through the flow of water through the feeding device; and intermixing the viscous nutrient fertilizer with the water entering the feeding device whereby the water leaving the device to plants and soil will include a fertilizer.

13 Claims, 2 Drawing Sheets

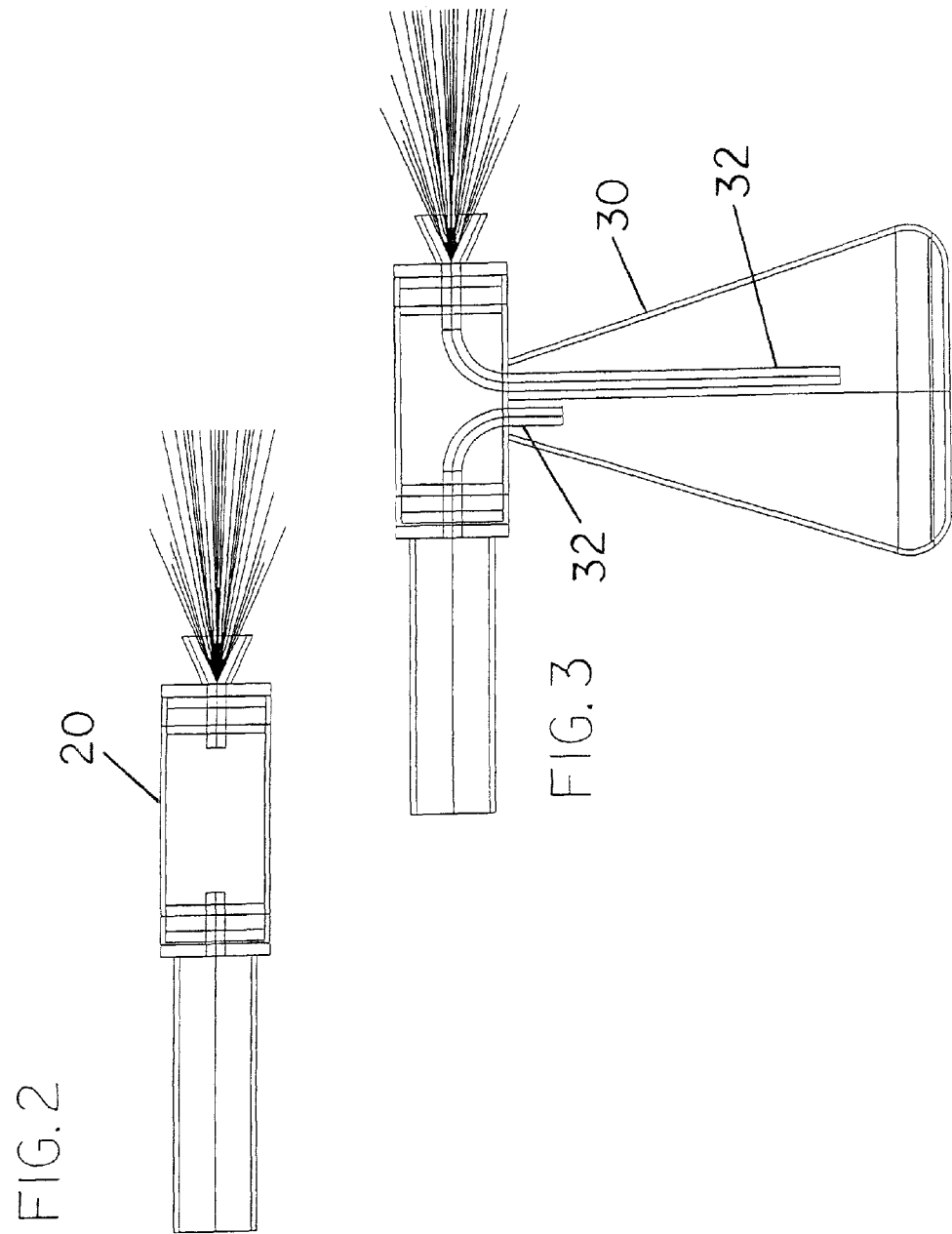

IRRIGATION METHOD USING THIXOTROPIC MATERIALS

RELATED APPLICATIONS

The present non-provisional patent application is based upon provisional Application No. 61/509,880 filed Jul. 20, 2011 and provisional Application No. 61/545,493 filed Oct. 10, 2011 and provisional Application No. 61/670,199 filed Jul. 11, 2012, the subject matter of which three applications is incorporated herein by reference.

BACKGROUND OF THE INVENTION

1. Field of the Invention

The present invention relates to an irrigation method using thixotropic materials and more particularly pertains to remediating soil while fertilizing plants with a thixotropic fertilizer.

2. Description of the Prior Art

The use of fertilizers is known in the prior art. More specifically, fertilizers previously devised and utilized for the purpose of facilitating plant growth are known to consist basically of familiar, expected and obvious structural configurations, notwithstanding the myriad of designs encompassed by the crowded prior art which has been developed for the fulfillment of countless objectives and requirements.

While known methods and devices fulfill their respective, particular objectives and requirements, the prior art does not describe an irrigation method using thixotropic materials that allows remediating soil while accelerating plant growth.

In this respect, the irrigation method using thixotropic materials according to the present invention substantially departs from the conventional concepts and designs of the prior art, and in doing so provides a method primarily developed for the purpose of remediating soil while accelerating plant growth.

Therefore, it can be appreciated that there exists a continuing need for a new and improved irrigation method using thixotropic materials which can be used for remediating soil while accelerating plant growth. In this regard, the present invention substantially fulfills this need.

SUMMARY OF THE INVENTION

In view of the foregoing disadvantages inherent in the known types of fertilizers now present in the prior art, the present invention provides an improved irrigation method using thixotropic materials. As such, the general purpose of the present invention, which will be described subsequently in greater detail, is to provide a new and improved irrigation method using thixotropic materials, a method which has all the advantages of the prior art and none of the disadvantages.

To attain this, the present invention essentially comprises an irrigation method which includes the step of: flowing a stream of water having input and output and intermediate location; interposing a feeding device into the stream of water at the intermediate location, the feeding device having input and output ends; inserting a quantity of nutrient fertilizer into the feeding device; converting the nutrient fertilizer from a viscous state to a less viscous state through the flow of water through the feeding device; and intermixing the viscous nutrient fertilizer with the water entering the feeding device whereby the water leaving the feeding device includes a fertilizer.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining a primary and alternate embodiments of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved irrigation method using thixotropic materials which has all of the advantages of the prior art fertilizers and none of the disadvantages.

It is another object of the present invention to provide a new and improved irrigation method using thixotropic materials which may be easily and efficiently manufactured and marketed.

It is a further object of the present invention is to provide a new and improved irrigation method using thixotropic materials which is susceptible of a low cost of manufacture with regard to both materials and labor, and which accordingly is then susceptible of low prices of sale to the consuming public, thereby making such irrigation method using thixotropic materials economically available.

Even still another object of the present invention is to provide an irrigation method using thixotropic materials for remediating soil while accelerating plant growth.

Lastly, it is an object of the present invention to provide a new and improved method of delivering fertilizer in thixotropic form into a stream of water for feeding plants in soil while remediating the soil, the delivering and feeding and remediating being done in a safe, ecological, convenient and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated the preferred and alternate embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 2 is a cross sectional view of another feeding device for dispensing a macro and/or micro-nutrient fertilizer to the flow of water, the nutrient fertilizer being in brick form.

FIG. 3 is a cross sectional view of a feeding device for dispensing a macro and/or micro-nutrient fertilizer to the flow of water, the nutrient fertilizer being in powder form.

The same reference numerals refer to the same parts throughout the various Figures.

DESCRIPTION OF THE PREFERRED EMBODIMENT

With reference now to the drawings, the preferred embodiment of the new and improved irrigation method using thixotropic materials embodying the principles and concepts of the present invention will be described.

The method of is for delivering nutrient fertilizer in thixotropic form into a stream of water for feeding plants in soil while remediating the soil. The delivering and feeding and remediating is done in a safe, ecological, convenient and economical manner.

The method includes a plurality of steps. The first step is providing a fertilizing system wherein the fertilizer system includes nitrogen/phosphorous/potassium and a microbial consortium to facilitate mining mineral nutrients from the soil. The fertilizer system also includes metabolites to remediate the soil and to accelerate chemical reactions between the nitrogen/phosphorous/potassium, the microbial consortium, the soil and the plants.

The next step is adding a binder to the fertilizing system to create a nutrient fertilizer. The nutrient fertilizer is in a form to facilitate delivery into the stream of water. Thixotropic materials are materials which are viscous or thick under normal conditions but become thin or less viscous and flow over time when shaken, agitated or otherwise stressed such as when flowing water is moved with respect to the material.

The next step is flowing a stream of water. The stream of water has an input location with a source of water. The stream of water also has an output location with the plants to be fertilized and the soil supporting the plants. The stream of water also has an intermediate location.

Interposing a feeding device into the stream of water at the intermediate location is the next step. The feeding device has an input end and an output end.

The following step is the step of inserting a quantity of the nutrient fertilizer into the feeding device.

The next step is converting the nutrient fertilizer in the feeding device from the viscous state to the less viscous state. This is achieved through the flow of water through the feeding device.

The final step is intermixing the viscous nutrient fertilizer with the water entering the feeding device. In this manner, the flow of water to the plants and the soil will be a fertilize system which includes a microbial consortium with metabolites.

The thixotropic material is alternatively adapted to be in brick form or in gel form or in powder form.

Figure 1:
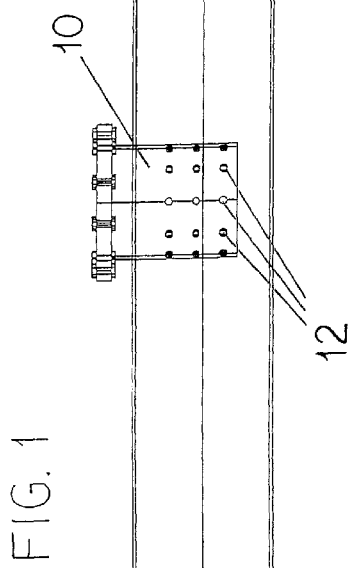
FIG. 1 is a cross sectional view of a feeding device for dispensing a macro and/or micronutrient fertilizer to the flow of water, the nutrient fertilizer being in gel form.
Figure 1A:
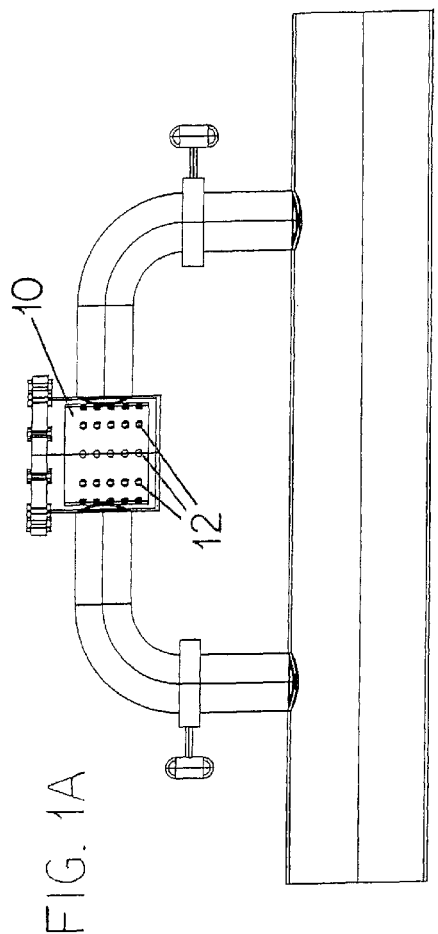
FIG. 1A is a cross sectional view similar to FIG. 1 but illustrating an alternate path of flow for the water.

In the FIG. 1, 1A embodiment, the feeding device is a cup-shaped member 10 with aperture 12. The cup-shaped member is in the path of flow of the water. The cup-shaped member has an axis perpendicular to the flow of water. The cup-shaped member is adapted to receive and support nutrient fertilizer in gel form. In FIG. 1, the feeding device is directly in the flow of water. In FIG. 1A, the feeding device is in a path of water 14 offset from the main path.

In the FIG. 2 embodiment, the feeding device is a cylindrically shaped member 20. The cylindrically shaped member is in the path of flow of the water. The cylindrically member has an axis aligned with the flow of water. The cup-shaped member has an enlarged diameter and is adapted to receive and support nutrient fertilizer in brick form.

In the FIG. 3 embodiment, the feeding device is a jar-shaped member 30. The jar-shaped member is positioned beneath the path of flow of the water. The jar-shaped member is adapted to receive and support nutrient fertilizer in powder form. Venturi tubes 32 operatively couple the flow of water and the nutrient fertilizer in the jar-shaped member.

The nutrient fertilizer of FIGS. 1 and 1A is in a gel form. Such gel form fertilizer includes macro or micro nutrients, in any combination or percentage, in any predetermined combination due to plant or soil requirements, and blended with a microbial culture or cultures with bacteria populations averaging and or attaining a minimum of $1 \times 10^4$ and more effectively maintaining averages reaching $2 \times 10^8$ and above and with the fungi meeting minimums of 20 to 100,000 propagules. The thixotropic gel form is made up of aqueous and or water soluble macro and micro nutrients with the microbial portion being aqueous or dried on glucose, diatomaceous earth, or lyophilized, with the addition of any organic or inorganic binders, saccharides and their derivatives like cellulose, methyl cellulose, and others like polyvinyl pyrrolidone and polyethylene glycol all which act as excipients and binders, and then dried into a gel form, which is capable of being drawn into irrigation through venturi methods and or injected by mechanical means through pumping systems, or placed inline irrigation systems creating a shearing process of the gel allowing the nutrients and microbial components to be delivered to the designated irrigated location more rapidly than but in a uniform pattern as in the solid form.

The nutrient fertilizer of FIG. 2 is in a brick form. Such brick or tablet form fertilizer includes any macro or micro nutrients, in any combination or percentage, in any predetermined combination due to plant or soil requirements, and blended with a microbial culture or cultures with bacteria populations averaging and or attaining a minimum of $1 \times 10^4$ and more effectively maintaining averages reaching $2 \times 10^8$ and above and with the fungi meeting minimums of 20 to 100,000 propagules. The solid, brick or tablet form is made up of water soluble macro and micro nutrients with the microbial portion being dried on glucose, diatomaceous earth, or lyophilized, with the addition of any organic or inorganic binders, saccharides and their derivatives like cellulose, methyl cellulose, and others like polyvinyl pyrrolidone and polyethylene glycol all which act as excipients and binders, and then dried or pressed into table or brick form, which are capable of being drawn into irrigation through venture methods and or injected by mechanical means through pumping systems, or placed inline irrigation systems creating a shearing process of the tablet or brick allowing the nutrients and microbial components to be delivered to the designated irrigated location.

The nutrient fertilizer of FIG. 3 is in a powder form. Such fertilizer in powder form includes any macro or micro nutrients, in any combination or percentage, in any predetermined combination due to plant or soil requirements, and blended with a microbial culture or cultures with bacteria populations averaging and or attaining a minimum of $1 \times 10^4$ and more effectively maintaining averages reaching $2 \times 10^8$ and above and with the fungi meeting minimums of 20 to 100,000 propagules. The powder form is made up of water soluble macro and micro nutrients with the microbial portion being dried on glucose, diatomaceous earth, or lyophilized, and is capable of being drawn into irrigation through venturi methods and or injected by mechanical means through pumping systems.

Lastly, the preferred binder in any of the above described embodiments is chosen from the class of binders including saccharides and their derivatives like cellulose, methyl cellulose, and others like polyvinyl pyrrolidone and polyethylene glycol all which act as excipients and binders.

In the various embodiments of the present invention as described herein above, the specific microbial consortium is preferably of the type disclosed in the aforementioned Application No. 61/509,880. The specific fertilizer including metabolites is preferably of the type disclose in the aforementioned Application No. 61/670,199. The specific thixotropic materials are preferably of the type disclosed in the aforementioned Application No. 61/545,493.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. An irrigation method including the steps of:

flowing a stream of water having input and output and intermediate location;

interposing a feeding device into the stream of water at the intermediate location, the feeding device having input and output ends;

inserting a quantity of nutrient fertilizer into the feeding device;

converting the nutrient fertilizer from the viscous state to the less viscous state through the flow of water through the feeding device, intermixing the viscous nutrient fertilizer with the water entering the feeding device; and flowing the water with the viscous nutrient fertilizer leaving the device to plants and soil, wherein the nutrient fertilizer takes a form selected from the group of forms consisting of gel and brick and powder and includes water soluble nutrients blended with at least one microbial culture with bacterial populations maintaining averages reaching $2\times10^8$ and above and with the fungi meeting minimums of 20 to 100,000 propagules with the microbial population being dried on glucose, diatomaceous earth or lyophilized.

2. The method as set forth in claim 1 wherein the nutrient fertilizer includes a binder selected from the group of binders consisting of saccharides and their derivatives, cellulose, methyl cellulose, polyvinyl pyrrolidone, and polyethylene glycol which act as excipients and binders, the nutrient fertilizer then dried into gel form.

3. The method as set forth in claim 1 wherein the nutrient fertilizer includes a binder selected from the group of binders consisting of saccharides and their derivative, cellulose, methyl cellulose, polyvinyl pyrrolidone, and polyethylene glycol which act as excipients and binders, the nutrient fertilizer then dried and pressed into brick form.

4. The method as set forth in claim 1 wherein the nutrient fertilizer takes a powder form and includes water soluble nutrients blended with at least one microbial culture with bacterial populations maintaining averages reaching $2\times10^8$ and above and with the fungi meeting minimums of 20 to 100,000 propagules with the microbial population being dried on glucose, diatomaceous earth or lyophilized.

5. A method of delivering fertilizer into a stream of water for feeding plants in soil while remediating the soil, the delivering and feeding and remediating being done in a safe, ecological, convenient and economical manner, the method including the steps of:

providing a fertilizing system, the fertilizing system including any one or a combination of macro and/or micro nutrients and a microbial consortium to facilitate mining mineral nutrients from the soil, the fertilizing system also including metabolites to remediate the soil and to accelerate chemical reactions between the nutrients, the microbial consortium, the soil and the plants;

adding a binder to the fertilizing system to create a nutrient fertilizer, the nutrient fertilizer being in a form to facilitate delivery into the stream of water;

flowing a stream of water, the stream of water having an input location with a source of water, the stream of water also having an output location with the plants to be fertilized and the soil supporting the plants, the stream of water also having an intermediate location;

interposing a feeding device into the stream of water at the intermediate location, the feeding device having an input end and an output end;

inserting a quantity of the nutrient fertilizer into the feeding device;

converting the nutrient fertilizer from the viscous state to the less viscous state through the flow of water through the feeding device;

intermixing the viscous nutrient fertilizer with the water entering the feeding device; and flowing the water with fertilizer to the plants and the soil, the fertilizing system including a microbial consortium with metabolites.

6. The method as set forth in claim 5 wherein the nutrient material is in brick form.

7. The method as set forth in claim 5 wherein the nutrient material is in gel form.

8. The method as set forth in claim 5 wherein the nutrient material is in powder form.

9. The method as set forth in claim 5 wherein the feeding device is a cup-shaped member with aperture, the cup-shaped member being in the path of flow of the water, the cup-shaped member having an axis perpendicular to the flow of water, the cup-shaped member adapted to receive and support nutrient fertilizer in gel form.

10. The method as set forth in claim 5 wherein the feeding device is a cylindrically shaped member, the cylindrically shaped member being in the path of flow of the water, the cylindrically shaped member having an axis aligned with the flow of water, the cylindrically shaped member adapted to receive and support nutrient fertilizer in brick form.

11. The method as set forth in claim 5 wherein the feeding device is a jar-shaped member, the jar-shaped member being positioned beneath the path of flow of the water, the jar-shaped member adapted to receive and support nutrient fertilizer in powder form, venturi tubes coupling the flow of water and the nutrient fertilizer in the jar-shaped member.

12. The method as set forth in claim 5 wherein the binder is selected from the group consisting of saccharides and their derivatives, cellulose, methyl cellulose, polyvinyl pyrrolidone and polyethylene glycol.

13. The method as set forth in claim 5 wherein the nutrient fertilizer is in thixotropic form.

\* \* \* \* \*